United States Patent [19]

Wirth et al.

[11] 3,725,321

[45] Apr. 3, 1973

[54] BLOWING AGENTS

[75] Inventors: Wolf-Dieter Wirth, Odenthal-Hannenberg; Erwin Muller; Johannes Blahak, both of Leverkusen; Harry Rohr, Cologne, all of Germany

[73] Assignee: Farbenfabriken Bayer Aktiengesellschaft, Leverkusen, Germany

[22] Filed: May 25, 1972

[21] Appl. No.: 256,933

[30] Foreign Application Priority Data

May 26, 1971 Germany.....................P 21 26 146.1

[52] U.S. Cl. ..........260/2.5 R, 260/2.5 N, 260/2.5 A, 260/23.7 R, 260/23.7 N, 260/23.7 H, 260/244 A, 260/858, 260/873, 260/874, 260/891, 260/897, 260/898

[51] Int. Cl................................................C08j 1/20
[58] Field of Search........................260/244 A, 2.5 R

[56] References Cited

UNITED STATES PATENTS 3,324,119  6/1967  Hill et al..........................260/244 A

FOREIGN PATENTS OR APPLICATIONS 1,135,789  12/1968  Great Britain....................260/244 A

*Primary Examiner*—Samuel H. Blech
*Assistant Examiner*—Morton Foelak
*Attorney*—Arthur G. Connolly et al.

[57] ABSTRACT

The invention relates to the use of 2,4-dioxo-1,2-dihydro-4H-benzoxazine as well as derivatives therefrom as blowing agents for the production of cellular and porous articles. These compounds do not liberate any corrosive, discolorizing, malodorous or toxic decomposition products.

19 Claims, No Drawings

BLOWING AGENTS

This invention relates to the use of compounds of the 2,4-dioxo-1,2-dihydro-4-H-benzoxazine series as blowing agents for the production of cellular and porous articles, especially for the production of foam plastics from thermoplastic synthetic resins.

It is known that foam plastics can be produced from thermoplastic synthetic resins by incorporating an organic blowing agent with the synthetic resin or by adding to a granulate synthetic resin a blowing agent which decomposes with the evolution of gas at temperatures at which the synthetic resin becomes plastic. Various classes of compounds have been described for this purpose in the literature, e.g. diazoaminobenzenes, azo-bis-isobutyronitrile, dinitrosopentamethylenetetramine, N,N'-dinitroso-N,N'-dimethyltetraphthalamide, azodicarbonamide and benzenesulphonic acid hydrazides (see Angewandte Chemie 64 [1952], pages 65 – 76). Substances from these classes of compounds have, however, certain disadvantages which restrict their use as blowing agents, for example they may liberate decomposition products which are acid or alkaline in reaction or are toxic. They may also give rise to discolorizing decomposition products which have a deleterious effect, for example, in the production of foam plastics based on polyvinyl chloride. When using azodicarbonamide, which is very frequently used in practice as a blowing agent, ammonia is present in the decomposition gases and causes corrosion of the metal moulds used for the production of the foams.

Another important factor is the decomposition temperature at which the blowing gas required for the foaming process is liberated. The decomposition point may lie above or below the decomposition point of the pure blowing agent, depending on the synthetic resin used or on the other substances added to the synthetic resin.

It was an object of the invention to find blowing agents which, when decomposed, would not liberate any corrosive, discolorizing, malodorous or toxic decomposition products and which would be suitable for the production of higher melting thermoplastic materials which are processed, for example, at temperatures of about 150° to 300° C.

The problem was solved by using derivatives of benzoxazine as blowing agents.

This invention thus relates to the use of compounds of the following general formula I

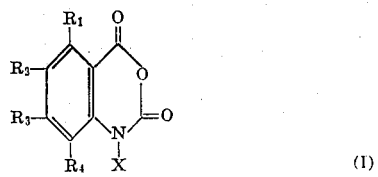

wherein $R_1 - R_4$ may be the same or different and denote hydrogen, straight or branched chain alkyl radicals having one to four carbon atoms, hydroxyl or nitro groups or halogen atoms and in addition $R_2$ may represent a radical of the following formula

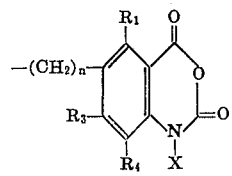

wherein $n$ may vary from 0 to 4 and the radicals $R_1$, $R_3$ and $R_4$ have the same meaning as above and X represents hydrogen or a straight or branched chain alkyl radical having one to four carbon atoms, as blowing agents for the production of cellular or porous synthetic resin articles.

The compounds according to the invention are suitable for the production of foam plastics from thermoplastic synthetic resins. The following are examples of suitable compounds according to the invention:
N-Methyl-isatoic acid anhydride; 5-hydroxy-isatoic acid anhydride; 5-chloro-isatoic acid anhydride; 3,5-dichloroisatoic acid anhydride; 5-bromo-isatoic acid anhydride; 3,5-dibromo-isatoic acid anhydride; 5-nitro-isatoic acid anhydride; isatoic acid anhydride; N-ethyl-5-chloro-isatoic acid anhydride; N-methyl-5-nitro-isatoic acid anhydride; 5-methyl-isatoic acid anhydride; 5-ethyl-isatoic acid anhydride; 5-n-propyl-isatoic acid anhydride; 5-isopropylisatoic acid anhydride; 5-n-butyl-isatoic acid anhydride; 5-isobutyl-isatoic acid anhydride; 5-tertiary-butyl-isatoic acid anhydride; 4-methyl-isatoic acid anhydride; 4-ethylisatoic acid anhydride; 4-n-propyl-isatoic acid anhydride; 4-isopropyl-isatoic acid anhydride; 4-n-butyl-isatoic acid anhydride; 4-isobutyl-isatoic acid anhydride; 4-tert.-butyl-isatoic acid anhydride; bis-isatoic acid anhydride and methylene-bis-isatoic acid anhydride.

The following are preferably used:
Isatoic acid anhydride, 5-chloro-isatoic acid anhydride and 5-nitro-isatoic acid anhydride.

The compounds are added in concentration of 0.01 to 30 percent by weight, preferably 1 to 10 percent by weight, based on the synthetic resin. The benzoxazines according to the invention may also be used in combination with a known blowing agent. These additional blowing agents are compounds which separate off or contain basic or acid components and thus function as activators for the decomposition of the 2,4-dioxo-1,2-dihydro-4H-benzoxazines. The following compounds may be mentioned as examples:
urea, ammonium carbonate, dicyanodiamide, disulphohydrazides, azodicarbonamide, N-methyldiethanolamine and triethanolamine. Azodicarbonamide and disulphohydrazides are especially preferred compounds.

The compounds can be used alone or in combination. These additives lower the decomposition temperature of the 2,4-dioxo-1,2-dihydro-4H-benzoxazines, give the foam a finely porous structure and raise the gas yield more than proportionately to their addition dosage. They are added in amounts of preferably 0.01 – 1 percent by weight, especially of 0.1 to 0.5 percent by weight, based on the synthetic resin.

The following are examples of thermoplastic synthetic resins with which they may be used:
Polystyrene, polyethylstyrene, polyalkylenes, polyvinyl chlorides, polyvinyl acetates, polymethacrylates, polymethyl acrylonitriles, polyacrylonitriles, polyamides, polyurethanes, polycarbonates, polysulphones, polyethylene terephthalates, polyacetals, polyphenyleneoxides, thermoplastic synthetic resins based on cellulose esters, and copolymers of the components mentioned above.

Mixtures of various thermoplastic polymers and so-called thermoplastic polyphasic synthetic resins may also be used for the production of foam plastics, for example the following:

Polymers of acrylonitrile, styrene and butadiene; mixtures of polysulphone and polymers of styrene and acrylonitrile, or polymers of acrylonitrile, butadiene and styrene; mixtures of polyphenylene oxide and polystyrene; mixtures of polyacetal and polyurethane; mixtures of polycarbonate and polymers of acrylonitrile, butadiene and styrene; mixtures of polyvinyl chloride and polymers of acrylonitrile, butadiene and styrene or mixtures of polyvinyl chloride and copolymers of ethylene and vinyl acetate; mixtures of polystyrene and rubbery elastic mixed or segmental polymers based on butadiene-, or styrene-acrylonitrile copolymers and butadiene-acrylonitrile polymers.

In a preferred embodiment of the invention, diphasic synthetic resins are used in which the hard phase based on halostyrene is made impact resistant by modification with a rubbery elastic phase based on butadiene.

It is preferred to use diphasic synthetic resins in which the hard phase based on copolymers of styrene and/or alkyl styrene and/or methylmethacrylate with acrylonitrile is made impact resistant by modification with a rubbery elastic phase based on butadiene and/or acrylic acid esters in which the alcohol component has one to six carbon atoms in an aliphatic or cycloaliphatic chain. Other diene rubbers based on isoprene or cyclopentadiene may also be used as the rubbery elastic phase, as may also copolymers of butadiene and styrene, butadiene and acrylonitrile, or ethylene/vinyl acetate copolymers or ethylene/propylene terpolymers, for example with dienes as the tercomponent.

It is especially preferred to use diphasic synthetic resins in which the hard phase based on styrene and/or alkyl styrene and acrylonitrile is made impact resistant by modification with a rubbery elastic phase based on butadiene, for example in a composition of 5 to 60 percent by weight of butadiene polymer which contains not more than 30 percent of copolymerized styrene, isoprene or acrylonitrile and 95 to 40 percent by weight of polymerized styrene and acrylonitrile in a proportion by weight of between 90 : 10 and 50 : 50, which styrene may be completely or partially replaced by $\alpha$-methylstyrene or methylmethacrylate.

The blowing agents to be used according to the invention may be mixed with the foaming mixtures by the usual methods, for example by means of mixing rollers, internal mixers or mixing vessels equipped with stirrers. They may be added at the same time as other components of the mixture.

The mixtures may also contain other known auxiliary agents, e.g. active or inactive fillers such as carbon black or chalk, antioxidants, antiozonants, stabilizers such as, for example salts of lead, cadmium, calcium, zinc, tin or barium, waxes, dyes, pigments, zinc oxide, fatty acids such as stearic acid, mineral oils, plasticizers such as dioctylphthalate, butyl nonylphthalate, butyl benzylphthalate, dibutylphthalate, dibutyladipate or tricresylphosphate, lubricants or peroxides.

The compounds used according to the invention may be prepared by known methods, e.g. as described in Organic Synthesis Coll Vol. III, page 488 by reacting the corresponding anthranilic acids or in analogous manner by reacting benzidine-3,3'-dicarboxylic acid or 4,4'-diamino-diphenylmethyl-3,3'-dicarboxylic acid with phosgene.

Example 1

The following substances were applied to mixing rollers at a temperature of 150° C and homogenized by rolling for 10 minutes:
  95.7 parts of a commercial ABS graft polymer consisting of 20.5 percent of acrylonitrile, 12.5 percent of butadiene and 67.0 percent of styrene,
  3.3 parts of 2,4-dioxo-1,2-dihydro-4-H-benzoxazine,
  0.5 parts of calcium stearate and
  0.5 parts of ionol.

The rolled sheet was size reduced and made into shaped products in an injection moulding machine at 220 to 240° C. The rate of feed was so calculated that the shaped products produced had a gross density of 0.7 g/cm². These products were found to have the following properties according to ASTM standards D 790 and D 256:
  Flexural strength 425 kg/cm²
  Impact strength 20 cm kg/cm (Charpy ¼").

Example 2

The following substances were applied to mixing rollers at a temperature of 140° C and homogenized by rolling for 10 minutes:
  96.2 parts of a commercial styrene/acrylonitrile copolymer consisting of 75 percent of styrene and 25 percent of acrylonitrile,
  3.3 parts of 2,4-dioxo-1,2-dihydro-4-H-benzoxazine and
  0.5 parts of calcium stearate.

The rolled sheet was size reduced after cooling and then made up to test rods in an injection moulding apparatus at 220° to 240° C. The rate of feed was so calculated that the extruded products had a gross density of 0.7 g/cm³. They were found to have the following properties according to the test standards ASTM D 790 and D 256:
  Flexural strength 506 kg/cm²
  Impact strength 8 cm kg/cm (Charpy ¼").

Example 3

The granulate of a commercial impact resistant polystyrene consisting of 94 percent of styrene and 6 percent of butadiene was fed into a paddle mixer (Lodige) and wetted with 0.5 percent (based on the granulate fed into the mixer) of butyl stearate by spraying the butyl stearate on the granulate at room temperature. 1 percent (based on the granulate fed into the apparatus) of finely powered 2,4-dioxo-1,2-dihydro-4 H-benzoxazine was then added and the components mixed for 5 minutes. The granulate with blowing agent adhering to its surface was worked up in an injection extruder at 185 to 225° C to produce test samples having a gross density of 0.75 g/cm³. The samples were found to have the following properties according to ASTM standards D 790 and D 256:
  Flexural strength 271 kg/cm²
  Impact strength 33 cm kg/cm.

Example 4

The granulate of a commercial polymethylmethacrylate was fed into a paddle mixer (Lodige) and wetted with 0.5 percent (based on the granulate) of butyl stearate by spraying the butyl stearate on the granulate at room temperature. 1 percent (based on the granulate) of finely powdered 2,4-dioxo-1,2-dihydro-4-H-benzoxazine was then added and the components mixed for 5 minutes. The granulate with blowing agent adhering to its surface was then worked up in an injection extruder at 210° to 250° C to produce test samples having a gross density of 0.85 g/cm³. They were found to have the following properties according to ASTM standards D 790 and D 256:

Flexural strength 554 kg/cm²
Impact strength 9 cm kg/cm (Charpy ¼").

Example 5

A polyvinyl chloride paste having the following composition was prepared on a three-roller mill at room temperature: 40 percent of PVC having a K value of about 70 (commercial paste), 40 percent of dioctylphthalate, 10 percent of 2,4-dioxo-1,2-dihydro-4-H-benzoxazine, 8 percent of zinc oxide and 2 percent e.g. of a barium-calcium dilaurate and epoxidized soya bean oil as stabilizer mixture. The paste was introduced into a mould measuring 100 × 100 × 10 mm³ and heated to a temperature of 190° C in a press at a pressure of 250 kg/cm² and left at this temperature for 5 minutes. After cooling, the plate produced was removed from the mould and exposed to a temperature of 120° C in a heating cupboard for 30 minutes. The expanded foam product thereby produced had a gross density of 0.54 g/cm³.

Example 6

A mixture of 3000 parts by weight of a graft copolymer of 17.5 percent of butadiene, 59.5 percent of styrene and 23 percent of acrylonitrile, 90 parts by weight of butyl stearate and 60 parts by weight of 2,4-dioxo-1,2-dihydro-4-H-benzoxazine was granulated in a double screw extruder at temperatures of between 120° and 145° C. The granulate was then worked up into shaped pieces in an injection moulding apparatus at a specific injection pressure of 800 kg/cm² and a mass temperature of 250° C. The parts have a matt surface and a characteristic foam structure with partly open and partly closed pores. The gross density is 0.74 g/cm³.

Example 7

A mixture of 89 parts of a polyethylene homopolymer having a density of 0.918 and melt index of 1.8 (conditions: temperature 190° C, charge 2.16 kg), 10 parts of 2,4-dioxo-1,2-dihydro-4-H-benzoxazine and 1 part of dicumylperoxide were homogenized on a roller for 10 minutes and then pressed to form a test plate. This plate was wrapped in aluminum foil and heated to 220° C in a metal bath for 4 minutes. A finely porous foam having a regular pore structure and a specific weight of 0.04 to 0.05 g/cm³ was obtained.

Example 8

A mixture of 90 parts by weight of 2,4-dioxo-1,2-dihydro-4-H-benzoxazine and 3 parts by weight of azodicarbonamide are employed as a blowing agent mixture and work is carried out at a mass temperature of 240° C according to Example 6. A very finely porous foam is obtained having a density of 0.06 g/cm³.

Example 9

A mixture of 3 parts by weight disulphohydrazide instead of azodicarbonamide is used as described in Example 8. In this way a finely porous foam is obtained having a density of 0.62 g/cm³.

Example 10

A mixture of 90 parts by weight of 2,4-dioxo-1,2-dihydro-4-H-benzoxazine are employed alone as a blowing agent as described in Example 8. When working at a mass temperature of 270° C, a foam is obtained having a coarser structure than in Examples 7 and 8 an a density of 0.64 g/cm³.

We claim:

1. A process for the production of a cellular or porous thermoplastic synthetic resin which includes the step of heating said resin in the presence of a heat decomposable compound or compounds of the formula:

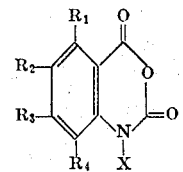

wherein
$R_1$ to $R_4$ may be the same or different and denote hydrogen, straight or branched chain alkyl radicals having one to four carbon atoms, hydroxyl or nitro groups or halogen atoms
and in addition $R_2$ may represent a radical of the following formula

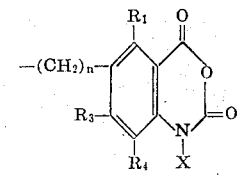

wherein
$n$ may vary from 0 to 4 and the radicals $R_1$, $R_3$ and $R_4$ have the same meaning as above
and X represents hydrogen or a straight or branched chain alkyl radical having one to four carbon atoms.

2. A process as claimed in claim 1 in which the blowing agent is isatoic acid anhydride, 5-chloro-isatoic acid anhydride or 5-nitro-isatoic acid anhydride.

3. A process as claimed in claim 1 in which the blowing agent is added in a concentration of from 0.01 to 30 percent by weight, based on the synthetic resin.

4. A process as claimed in claim 3 in which the concentration of blowing agent is from 1 to 10 percent by weight, based on the synthetic resin.

5. A process as claimed in any of claim 1 in which the synthetic resin is a polystyrene, a polyethyl styrene, a polyalkylene, a polyvinyl chloride, a polyvinyl acetate, a polymethacrylate, a polymethyl acrylonitrile, a polyacrylonitrile, a polyamide, a polyurethane, a polycarbonate, a polysulphone, a polyethylene tetephthalate, a polyacetal, a polyphenyleneoxide, a thermoplastic synthetic resin based on a cellulose ester or a copolymer of any of these components.

6. A process as claimed in any of claim 1 in which the synthetic resin is a mixture of a thermoplastic polymer and a thermoplastic polyphasic synthetic resin.

7. A process as claimed in claim 6 in which the thermoplastic synthetic resin is a polymer of acrylonitrile, styrene and butadiene, a mixture of a polysulphone and a polymer of styrene and acrylonitrile or acrylonitrile, butadiene and styrene, a mixture of a polyphenylene oxide and a polystyrene, a mixture of a polyacetal and a polyurethane, a mixture of a polycarbonate and a polymer of acrylonitrile, butadiene and styrene, a mixture of a polyvinyl chloride and a polymer of acrylonitrile, butadiene and styrene or a copolymer of ethylene and vinyl acetate or a mixture of polystyrene and a rubbery elastic mixed or segmental polymer based on a butadiene or styrene-acrylonitrile copolymer and a butadiene-acrylonitrile polymer.

8. A process as claimed in claim 1 in which the synthetic resin is a diphasic synthetic resin in which the hard phase, based on polystyrene or a copolymer of styrene and alkylstyrene or halostyrene, is made impact resistant by modification with a rubbery elastic phase based on butadiene.

9. A process as claimed in claim 8 in which the hard phase based on a copolymer of styrene or alkylstyrene or methylmethacrylate or mixtures thereof with acrylonitrile is made impact resistant by modification with a rubbery elastic phase based on butadiene or an acrylic acid ester or mixtures thereof in which the alcohol component has one to six carbon atoms in an aliphatic or cycloaliphatic chain, a diene rubber based on isoprene or cyclopentadiene, a copolymer of butadiene and styrene, butadiene and acrylonitrile or ethylene and vinyl acetate, or a terpolymer of ethylene, propylene and a diene.

10. A process as claimed in claim 8 in which the hard phase based on styrene and/or alkylstyrene and acrylonitrile is made impact resistant by modification with a rubbery elastic phase based on butadiene, in a composition of 5 to 60 percent by weight of butadiene polymer which contains not more than 30 percent of copolymerized styrene, isoprene or acrylonitrile and 95 to 40 by weight of polymerized styrene and acrylonitrile in a proportion by weight of between 90 : 10 and 50 : 50, which styrene may be completely or partly replaced by α-methylstyrene or methylmethacrylate.

11. A process as claimed in claim 1 in which the blowing agent is mixed with the foaming mixture by means of a mixing roller, an internal mixer or a mixing vessel equipped with a stirrer.

12. A process as claimed in claim 1 in which the blowing agent is used in combination with another blowing agent.

13. A process as claimed in claim 1 in which the other blowing agents contain and split-off basic or acid gases.

14. A process as claimed in claim 1 in which the additionally added blowing agent is urea, ammonium carbonate, dicyandiamide, disulphohydrazides, azodicarbonamide, N-methyl-diethanolamine and triethanolamine.

15. A process as claimed in claim 1 in which the additionally added blowing agent is azodicarbonamide and disulphohydrazides.

16. A process as claimed in claim 1 in which the additional blowing agent is added in a concentration of from 0.01 to 1 percent by weight based on the synthetic resin.

17. A process as claimed in claim 1 in which the additional blowing agent is added in a concentration of from 0.1 to 0.5 percent by weight based on the synthetic resin.

18. A process as claimed in claim 1 in which the blowing agent is used in combination with an auxiliary agent or agents.

19. A process as claimed in claim 18 in which the auxiliary agent is an active or inactive filler, carbon black, chalk, an antiozonant, a stabilizer, a salt of lead, calcium, zinc, tin or barium, a wax, a dye, a pigment, zinc oxide, a fatty acid, stearic acid, a mineral oil, a plasticizer, dioctylphthalate, butyl nonylphthalate, butyl benzylphthalate, dibutyl-phthalate, dibutyl adipate, tricresylphosphate, a lubricant or a peroxide.

* * * * *